Feb. 22, 1949.   G. C. MOLOTZAK   2,462,659
HERMETICALLY SEALED, SELF-LUBRICATING SLIDE BEARING
Filed April 7, 1947
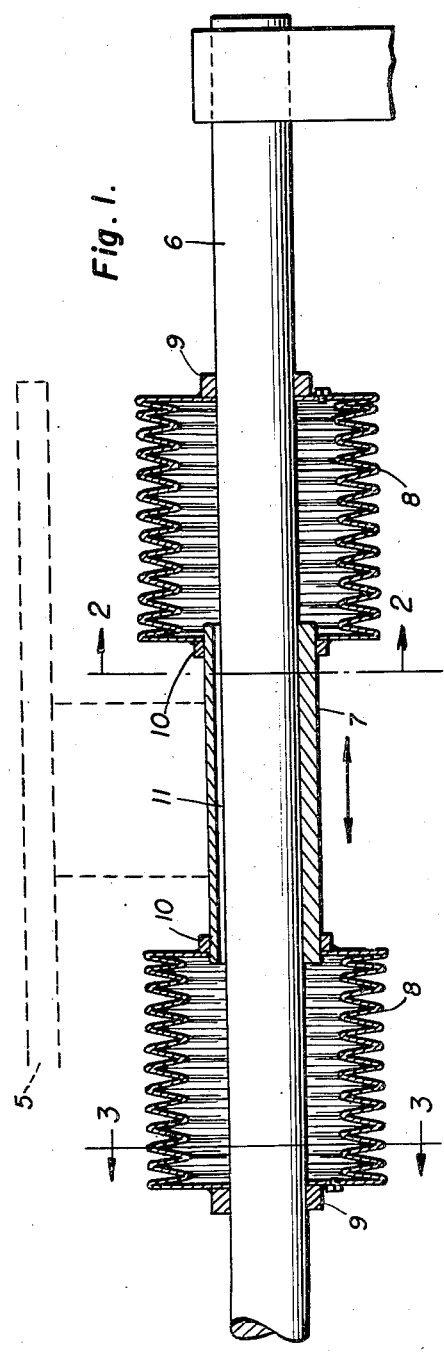
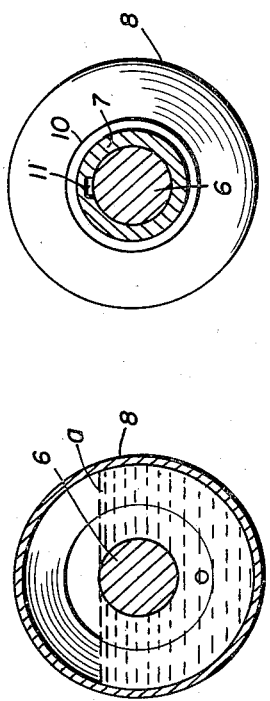
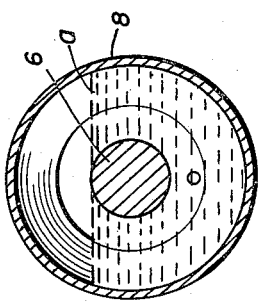
Inventor
George C. Molotzak
By *Clarence A. O'Brien
and Harvey B. Jacobson*
Attorneys Patented Feb. 22, 1949

2,462,659

UNITED STATES PATENT OFFICE 2,462,659

HERMETICALLY SEALED, SELF-LUBRICATING SLIDE BEARING

George C. Molotzak, Coaldale, Pa.

Application April 7, 1947, Serial No. 739,897

3 Claims. (Cl. 308—5)

This invention relates to an improved slide bearing for reciprocating machine parts, and the primary object of the invention is to provide a bearing of this kind which is hermetically sealed to prevent entrance of dust and other injurious foreign matter between the parts of the bearing, and which is so constructed as to render the bearing self-lubricating.

A more specific object of the invention is to provide a bearing of the above kind which is comparatively simple and durable in construction and highly efficient in operation.

The exact nature of the present invention will become apparent from the following description when considered in connection with the accompanying drawing, in which:

Figure 1 is a fragmentary view, partly in side elevation and partly in longitudinal section, showing a slide bearing constructed in accordance with the present invention.

Figures 2 and 3 are transverse sectional views taken respectively on line 2—2 and line 3—3 of Figure 1.

Referring in detail to the drawing, the present invention relates to a slide bearing for a reciprocating machine part indicated by dotted lines at 5, the bearing including a stationary guide rod 6 and a bearing sleeve 7 reciprocable on the guide rod 6.

In accordance with the present invention, a metal bellows 8 is provided which hermetically seals each end of the bearing sleeve 7 to the guide rod 6, and which contains a quantity of lubricant indicated at $a$ in Figure 3. Each bellows 8 has a fluid-tight connection at its outer end with the guide rod 6, such connection including a collar 9 tightly fitted and secured on the guide rod 6 and having the outer end of the associated bellows 8 welded or otherwise attached thereto so as to form a fluid-tight joint. Each bellows also has a fluid-tight connection at its inner end with the adjacent end of the bearing sleeve 7, the latter connection also preferably including a collar 10 tightly fitted and secured on the adjacent end of bearing sleeve 7 and having the inner end of the associated bellows 8 welded or otherwise secured thereto so as to form a fluid-tight joint. The bearing sleeve 7 is preferably provided with an internal longitudinally extending groove 11 which opens through opposite ends of the bearing sleeve 7 and places the bellows 8, 8 in communication with each other through the restricted passage afforded by the groove 11. The groove 11 may be straight, as shown, or it may be of gradual helical form, its purpose being to facilitate flow of lubricant between the contiguous surfaces of the guide rod and the bearing sleeve and passage of lubricant from one bellows to the other.

In operation, upon reciprocation of the bearing sleeve 7 with the machine part 5 and upon the guide rod 6, the two bellows 8 will alternately force the lubricant therefrom to and between the guide rod and the bearing sleeve. For instance, upon movement of the machine part 5 and bearing sleeve 7 to the right of Figure 1, the right-hand bellows 8 will be collapsed and the left-hand bellows 8 will be expanded. This causes the lubricant in the right-hand bellows 8 to be forced and drawn from the latter through the groove 11 into the left-hand bellows, some of the lubricant flowing from groove 11 around the guide rod 6 between the contiguous surfaces of guide rod 6 and sleeve 7. When the machine part 5 and bearing sleeve 7 move to the left of Figure 1, the the reverse of this operation takes place, the left-hand bellows being collapsed and the right-hand bellows being expanded. In this way, a constant supply of lubricant is forced between the guide rod and the bearing sleeve so as to lubricate their coacting surfaces and minimize wear, as well as to insure free movement of the machine part and the bearing sleeve. Due to the hermetic seal between each end of the bearing sleeve and the guide rod, dust and other detrimental foreign matter are excluded from between the contiguous surfaces of the guide rod and the bearing sleeve. The bearing will be effectively lubricated over a substantially indefinite length of time, and the bearing will have a long continued period of usefulness. Any suitable means may be provided to facilitate introduction of the lubricant into the bellows or for draining lubricant therefrom when renewal of the lubricant may be deemed desirable. It will, of course, be understood that the machine part may be equipped with a plurality of the slide bearings, and that the invention is applicable to various machines in which slide bearings are employed.

What I claim is:

1. The combination with a stationary guide rod, and a bearing sleeve reciprocable thereon, of a metal bellows hermetically sealing each end of said bearing sleeve to the guide rod and containing a quantity of lubricant, each bellows having a fluid-tight connection at its outer end with the guide rod and at its inner end with the adjacent end of the bearing sleeve, whereby, upon reciprocation of the bearing sleeve, the bellows will alternately force the lubricant therefrom to and between said guide rod and said bearing sleeve.

2. The construction defined in claim 1, wherein the bearing sleeve is provided with an internal longitudinal groove which opens through the ends of the bearing sleeve and affords a restricted communication between the bellows.

3. The combination with a rod element, and a bearing sleeve element therefor, one of said elements being reciprocable, of a bellows hermetically sealing each end of said bearing sleeve element to the rod element and containing a quantity of lubricant, each bellows having a fluid-tight connection at its outer end with the rod element and at its inner end with the adjacent end of the bearing sleeve element, whereby, upon reciprocation of the reciprocable element, the bellows will alternately force the lubricant therefrom to and between said rod element and said bearing sleeve element.

GEORGE C. MOLOTZAK.

No references cited.